(12) United States Patent
Hum et al.

(10) Patent No.: US 7,921,251 B2
(45) Date of Patent: Apr. 5, 2011

(54) GLOBALLY UNIQUE TRANSACTION IDENTIFIERS

(75) Inventors: Herbert H. J. Hum, Portland, OR (US); Aaron T. Spink, San Francisco, CA (US); Robert G. Blankenship, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/754,089

(22) Filed: Apr. 5, 2010

(65) Prior Publication Data

US 2010/0191890 A1    Jul. 29, 2010

Related U.S. Application Data

(63) Continuation of application No. 10/832,606, filed on Apr. 27, 2004, now Pat. No. 7,716,409.

(51) Int. Cl.
*G06F 13/14* (2006.01)
(52) U.S. Cl. ........................................ 710/305; 711/141
(58) Field of Classification Search .......... 710/305–306; 711/141, 146
See application file for complete search history.

(56) References Cited

U.S. PATENT DOCUMENTS

| 6,009,488 | A  | 12/1999 | Kavipurapu ............... 710/105 |
| 6,243,781 | B1 | 6/2001  | Gandhi et al. .............. 710/129 |
| 6,272,563 | B1 | 8/2001  | Ajanovic et al. ............ 710/29 |
| 6,516,375 | B1 | 2/2003  | Ajanovic et al. ............ 710/305 |
| 6,681,292 | B2 | 1/2004  | Creta et al. ................. 711/119 |
| 2003/0046356 | A1 | 3/2003 | Alvarez et al. ............. 709/208 |
| 2003/0188072 | A1 | 10/2003 | Creta et al. ................. 710/306 |
| 2005/0060480 | A1 | 3/2005 | Solomon ..................... 710/306 |

OTHER PUBLICATIONS

Co-Pending U.S. Appl. No. 10/832,607 filed Apr. 27, 2004, entitled "Transmitting Peer-to-Peer Transactions Through a Coherent Interface" by Kenneth C. Creta, et al.
Co-Pending U.S. Appl. No. 10/833,236 filed Apr. 27, 2004, entitled "Separating Transactions Into Different Virtual Channels" by Kenneth C. Creta, et al.

*Primary Examiner* — Clifford H Knoll
(74) *Attorney, Agent, or Firm* — Trop, Pruner & Hu, P.C.

(57) ABSTRACT

In one embodiment of the present invention, a method includes identifying a transaction from a first processor to a second processor of a system with a transaction identifier. The transaction identifier may have a value that is less than or equal to a maximum number of outstanding transactions between the two processors. In such manner, a transaction field for the transaction identifier may be limited to n bits, where the maximum number of outstanding transactions is less than or equal to $2^n$. In various embodiments, such a transaction identifier combined with a source identifier and a home node identifier may form a globally unique transaction identifier.

19 Claims, 4 Drawing Sheets

GLOBALLY UNIQUE TRANSACTION IDENTIFIERS

This application is a continuation of U.S. patent application Ser. No. 10/832,606 filed Apr. 27, 2004 now U.S. Pat. No. 7,716,409 entitled "GLOBALLY UNIQUE TRANSACTION IDENTIFIERS," the content of which is hereby incorporated by reference.

BACKGROUND

The present invention relates to communications within a system and more particularly to interprocessor communication (IPC) protocols. Typical IPC protocols within a system rely on a unique identifier number embedded in a transaction packet to identify a response from a replying processor. For example, a first processor can send a read request to a memory controller hub (MCH) with an identifier of 10, for example. When the memory controller hub responds with the data, it includes identifier number 10 with the data packet. In this manner, data responses can be returned out-of-order with the request stream for increased performance.

Typically, the number of bits in the identifier field in a request or response packet is sized such that the total number of outstanding transactions for the entire system can be uniquely represented. As the number of processors in the system grows, ideally the number of outstanding transactions in the system should also grow. However, using a fixed size identifier field that is sized for a large system can penalize small systems with extra unused bits in the identifier field, negatively affecting performance. Alternately, setting the fixed size identifier field to be efficient for a typical small system can limit the ability to support large systems by limiting the total amount of outstanding transactions. A need thus exists to more efficiently identify transactions flowing through a system.

DETAILED DESCRIPTION

Figure 1:
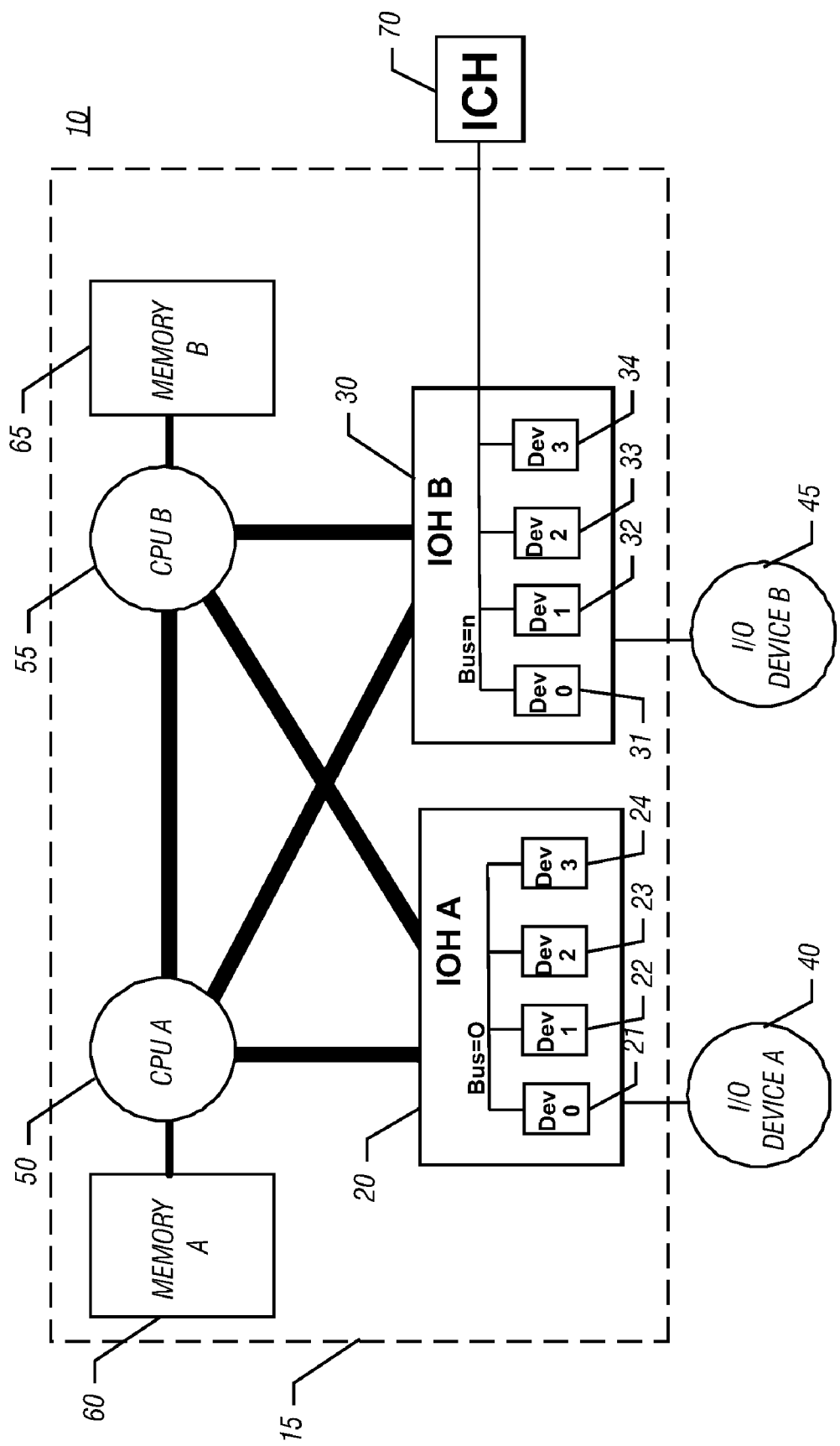
FIG. 1 is a block diagram of a coherent system in accordance with one embodiment of the present invention.

In various embodiments of the present invention, a transaction identifier field may be sized to accommodate a maximum number of transactions between any two processors of a system. That is, a unique set of numbers may be used as transaction identifiers to uniquely identify transactions between two processors. This set of numbers may be used by each processor within a system to identify transactions between it and all other processors in the system. Thus, the transaction identifiers are not unique across the system but rather are usable by each processor in the system. As used herein, the term "processor" may include microprocessors, memory hubs, input/output (I/O) hubs, bridges, switches, and other such components that perform actions on data and instructions.

A transaction identifier, a requestor node identifier (e.g., a source identifier) corresponding to a requestor device, and a home node identifier (e.g., a home node identifier) corresponding to a target device that includes (i.e., owns) a physical address space that is specified by the transaction together may form a globally unique transaction identifier (GUTI) in accordance with an embodiment of the present invention. Such a GUTI may be part of a header sent with a packet or other information package. In certain embodiments, an additional identifier, namely a target identifier (e.g., a designation ID) corresponding to a target of the transaction, may also be considered part of a GUTI.

For instance, a three processor system may support a total of sixteen outstanding transactions from any given processor. Additionally, each processor may handle 16 local outstanding local requests. Thus in total there may be 144 outstanding transactions simultaneously in flight in the system. Since there are a total of three processors that may respond to a request according to this embodiment, the source and home node identifier fields may each be two bits. In this embodiment, the transaction identifier field may be four bits (i.e., $2^4$) to support 16 transactions between any two processors. The 16 transaction identifiers of this embodiment may be used by each of the processors to uniquely identify transactions between itself and the other two processors.

In such manner, the two source identifier bits (source ID) plus the two home node identifier bits (home node ID) plus the four transaction identifier bits (transaction ID) together form a globally unique transaction identifier for such an embodiment. Accordingly, a GUTI for this embodiment is eight bits.

If a designer desires to grow a system to support eight processors, the source and home node ID fields may be set to three bits each, and the system naturally grows to support 8×16 requests, for a total of 1024 outstanding requests. In such an embodiment, a GUTI may be ten bits. Of course, in other embodiments, more or fewer processors or outstanding transactions per processor may be supported, and the GUTI may flexibly expand (or contract) as needed to support a total number of outstanding transactions for the system.

Referring to FIG. 1, shown is a block diagram of a system with which embodiments of the present invention may be used. As shown in FIG. 1, system 10 may be a multi-processor system including a coherent interface. That is, system 10 may represent any one of a desired desktop, mobile, server platform or other such platform, in different embodiments. In certain embodiments, interconnections between different components of FIG. 1 may be point-to-point interconnects that provide for coherent shared memory within system 10, and in one such embodiment the interconnects and protocols used to communicate therebetween may form a common system interface (CSI). In such manner, multiple processors, memories, and other components of system 10 may coherently interface with each other. However, it is to be understood that the scope of the present invention is not so limited, and embodiments may be used in other systems.

Referring to FIG. 1, system 10 may include a first processor 50 (CPU A) and a second processor 55 (CPU B). In various embodiments, each processor may include memory controller functionality such that the processors may directly interface with an associated shared memory via a point-to-point interconnect. For example, as shown in FIG. 1, processor 50 may be coupled to a memory 60 (memory A) via a point-to-point interconnect and processor 55 may be coupled to a memory 65 (memory B) via a similar point-to-point interconnect. More so, processors 50 and 55 may also be coupled to each other via a point-to-point interconnect. Similarly, each of processors 50 and 55 may be coupled via point-to-point interconnects to each of a first input/output hub (IOH A) 20 and a second IOH 30 (IOH B).

In the embodiment of FIG. 1, all components within box 15 may collectively form a coherent system (i.e., coherent system 15). Such a coherent system may accommodate coherent transactions without any ordering between channels through which transactions flow. While discussed herein as a coherent system, it is to be understood that both coherent and non-coherent transactions may be passed through and acted upon by components within the system. For example, a region of one or both of memories 60 and 65 may be reserved for non-coherent transactions. While the embodiment of FIG. 1 shows a platform topology having two processors and two I/O hubs, it is to be understood that other embodiments may include more or fewer such components. For example, a single processor system may be implemented having a single processor, a single I/O hub and associated I/O devices coupled thereto. Alternately, a multiprocessor system having 4, 8, 16, 32 or another number of processors may be implemented, and an appropriate number of I/O hubs and other components may be coupled thereto. Any such platform topologies may take advantage of point-to-point interconnections to provide for coherency within a coherent portion of the system, and also permit non-coherent peer-to-peer transactions between I/O devices coupled thereto. Such point-to-point interconnects may thus provide multiple paths between components.

As shown in FIG. 1, I/O hubs 20 and 30 may each include a plurality of ports (e.g., ports 21-24 in IOH 20 and ports 31-34 in IOH 30) to interface with I/O devices coupled thereto. For example, in certain embodiments, such I/O devices may be devices in accordance with one or more bus schemes. In one embodiment, such I/O devices may be Peripheral Component Interconnect (PCI) Express™ devices in accordance with the PCI Express Base Specification version 1.0a (published July 2002). As used herein, such devices may be referred to as "PCI-E" devices.

For simplicity, FIG. 1 shows a single I/O device coupled to each I/O hub, namely I/O device (I/O device A) 40 coupled via port 21 to IOH 20 and I/O device (I/O device B) 45 coupled via port 31 to IOH 30. It is to be understood that the number of ports in an I/O hub in accordance with an embodiment of the present invention may vary, and the number of ports and devices coupled thereto shown in FIG. 1 are for illustrative purposes only.

Also shown in FIG. 1 is a legacy I/O controller hub (ICH) 70 coupled to IOH 30. In one embodiment, ICH 70 may be used to couple legacy devices such as a keyboard, mouse, and Universal Serial Bus (USB) devices (e.g., devices in accordance with the USB Specification Rev. 2.0 (published December 2000)) to coherent system 15.

While the I/O hubs shown in FIG. 1 include a plurality of ports, it is to be understood that the hubs may realize various functions using a combination of hardware, firmware and software. Such hardware and software may be used so that the I/O hub may act as an interface between coherent system 15 (e.g., shared memories 60 and 65, processors 50 and 55, and IOHs 20 and 30), and devices coupled thereto such as I/O devices 40 and 45. In addition, the I/O hubs of FIG. 1 may be used to support various bus or other communication protocols of devices coupled thereto. IOH 20 and IOH 30 may act as agents to provide a central connection between two or more communication links. In particular, IOH 20 and IOH 30 may be referred to as "CSI agents" that provide a connection between different I/O devices coupled to coherent system 15. In various embodiments, other components within coherent system 15 may also act as CSI agents.

Figure 2:
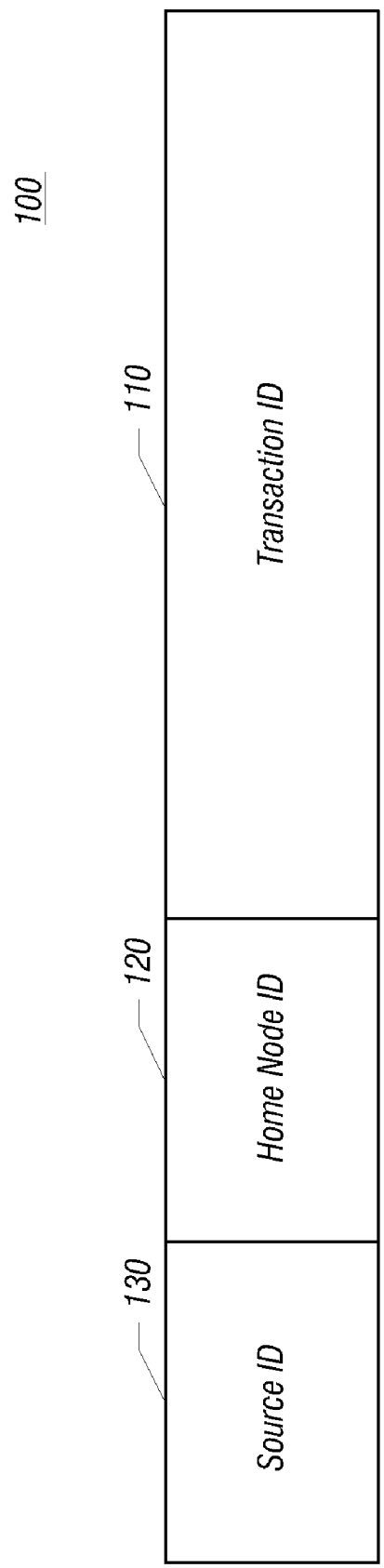
FIG. 2 is a diagram of a globally unique transaction identifier in accordance with one embodiment of the present invention.

Referring now to FIG. 2, shown is a block diagram of a globally unique transaction identifier in accordance with one embodiment of the present invention. As shown in FIG. 2, GUTI 100 includes a transaction ID field 110, a home node ID field 120, and a source ID field 130. As shown in the embodiment of FIG. 2, transaction ID field 110 is located in the least significant bits (LSB) of GUTI 100, home node ID field 120 is located in the middle bits, and source ID field 130 is located in the most significant bits (MSB) of GUTI 100. While shown in the embodiment of FIG. 2 as being a contiguous group of fields, in other embodiments, the different fields need not be contiguous. For example, the fields may be located in different portions of a packet header of a desired protocol.

Thus in various embodiments, a transaction ID field may be varied to support requirements of differently sized systems. Such a variable transaction ID field may be set using a combination of hardware, firmware, and software, in different embodiments. For example, based on a topology of a given system, firmware within an I/O hub or other such device may be set so that the transaction ID fields are generated to meet the system requirements. As a result, it may be possible to modify a size of a transaction ID field during system usage, for example, when additional processing resources are placed into the system. In various embodiments, a transaction ID field in accordance with an embodiment of the present invention may be shorter than a fixed transaction ID field, as encoding bits use for source and home node identification may be used together with the transaction ID field to form a global unique transaction identifier.

Figure 3:
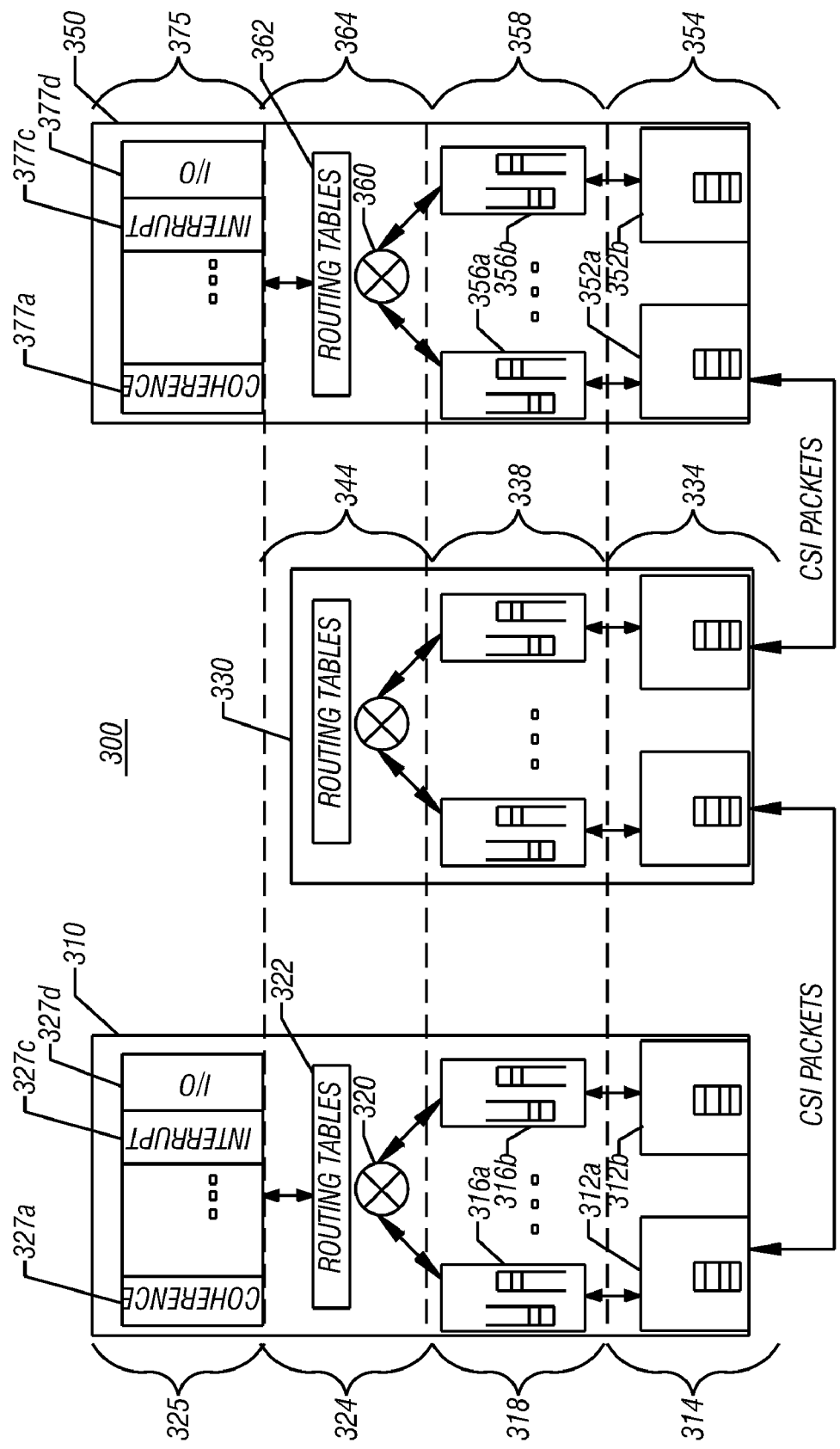
FIG. 3 is a block diagram of a portion of a coherent system in accordance with one embodiment of the present invention.

Referring now to FIG. 3, shown is a block diagram of a portion of a coherent system in accordance with one embodiment of the present invention. As shown in FIG. 3, system 300 includes a first CSI agent 310, a second CSI agent 350, and a bridging agent 330. In one embodiment, CSI agents 310 and 350 may be I/O hubs, while bridging agent 330 may be a switching device. In other embodiments, it is to be understood that CSI agents may be microprocessors, other bus agents, and the like. While discussed in the embodiment of FIG. 3 as a coherent system, it is to be understood that the scope of the present invention is not so limited.

CSI agent 310 may include a plurality of layers, including a physical layer 314, a link layer 318, a routing layer 324 and a protocol layer 325. Packets may be received in CSI agent 310 at physical layer 314, which may include a plurality of electrical transfer ports 312a and 312b. While shown as including two such ports in the embodiment of FIG. 3, it is to be understood that additional ports may be present in other embodiments.

As shown in FIG. 3, the packets may be CSI packets, however the scope of the present invention is not so limited. Such packets may include a header and associated information (e.g., a "payload"). The packets are then forwarded to link layer 318, which may include a plurality of buffer flow control mechanisms. Shown in the embodiment of FIG. 3 are two buffer flow control mechanisms 316a and 316b, each of which may include an incoming buffer and an outgoing buffer. Link layer 318 may be used to ensure accuracy of receipt of flit-based portions of packets from a point-to-point interconnect to which agent 310 is coupled. As used herein, the term flit means a smallest unit of data transfer which, in one embodiment, may be 80 bits.

When flits are properly received, link layer 318 may provide the flits to routing layer 324, where they are multiplexed through a switch 320 and provided to routing tables 322, which use, for example, a destination ID field value to route the associated header and payload (if present) to the proper agent. If a packet is destined for agent 310, routing tables 322 will provide the packet to protocol layer 325. Alternately, if the packet is destined for another destination, the packet will be sent back through link layer 318 and physical layer 314 of agent 310 to a different agent.

In various embodiments of the present invention, protocol layer 325 may use a transaction ID associated with the header to order a transaction and perform desired processing thereon, using various engines within protocol layer 325. Representative engines in the embodiment of FIG. 3 include a coherence engine 327a, an interrupt engine 327c, and an I/O engine 327d. Furthermore, protocol layer 325 may be used to generate transaction identifiers for outgoing transactions from agent 310. For example, such transaction identifiers may be generated using a tracking structure in protocol layer 325 that maintains an inventory and status of transaction identifiers being generated by coherent agent 310.

Similar functionality may be present in agent 350, which includes a corresponding physical layer 354, link layer 358, routing layer 364, and protocol layer 375. As further shown in FIG. 3, each of these layers may include components similar to those of agent 310, including, for example, electrical transfer units 352a and 352b, buffer flow control mechanisms 356a and 356b, switch 360, routing tables 362, and protocol engines 377a-d.

Further shown in FIG. 3, a bridging agent 330 may include corresponding physical, link, and routing layers (respectively, physical layer 334, link layer 338, and routing layer 344). In certain embodiments, bridging agent 330 may be a switch, bridge, hub, or the like, and may be used to provide a bridge between a different set of agents or nodes of coherent system 300. For example, in another embodiment, bridging agent 330 may be coupled to a first plurality of processors (e.g., on a left hand side) and a second plurality of processors (e.g., on a right hand side).

In certain embodiments, bridging agent 330 may route snoop transactions between CSI agents. Bridging agent 330 may forward such transactions to one or a plurality of CSI agents coupled thereto. Also, bridging agent 330 may provide a fan out of a snoop transaction by adding different destination identifiers to the snoop transaction to thereby route the transaction to multiple agents.

If one such CSI agent responds, for example, with data corresponding to the requested snoop transaction, the responding agent may send the payload data with a header including the original GUTI plus a source identifier that identifies the responding agent. Thus a response packet may include the source ID, home node ID, and transaction ID of the original snooped transaction, and may further include a source identifier for the responding agent. In such manner, the bridging agent may forward transactions from nodes or agents on a first side of the bridging agent to nodes or agents on a second side of the bridging agent.

In certain embodiments, particularly for coherent traffic, such as a snoop request, a requesting agent may broadcast the snoop request to some or all caching agents in the system (e.g., all agents within its broadcast domain). In such an embodiment, each snoop that is broadcast may have a different destination ID and a common physical address. Thus such transactions may include a GUTI and a different destination ID for each caching agent. In the snoop request packet, the home node ID may not be sent in the packet field, but rather may be implied based on address mapping using the physical address of the snoop request. For example, when the caching agent searches its address maps, the transmitted address may be indicative of the home node ID of the owner of the data. Accordingly, when responding to such a snoop request, the caching agent may send a GUTI that may be formed with a home node ID generated based on the address it received in the request. Thus the GUTI may include the original source ID, the original transaction ID, and the home node ID obtained from the address.

Figure 4:
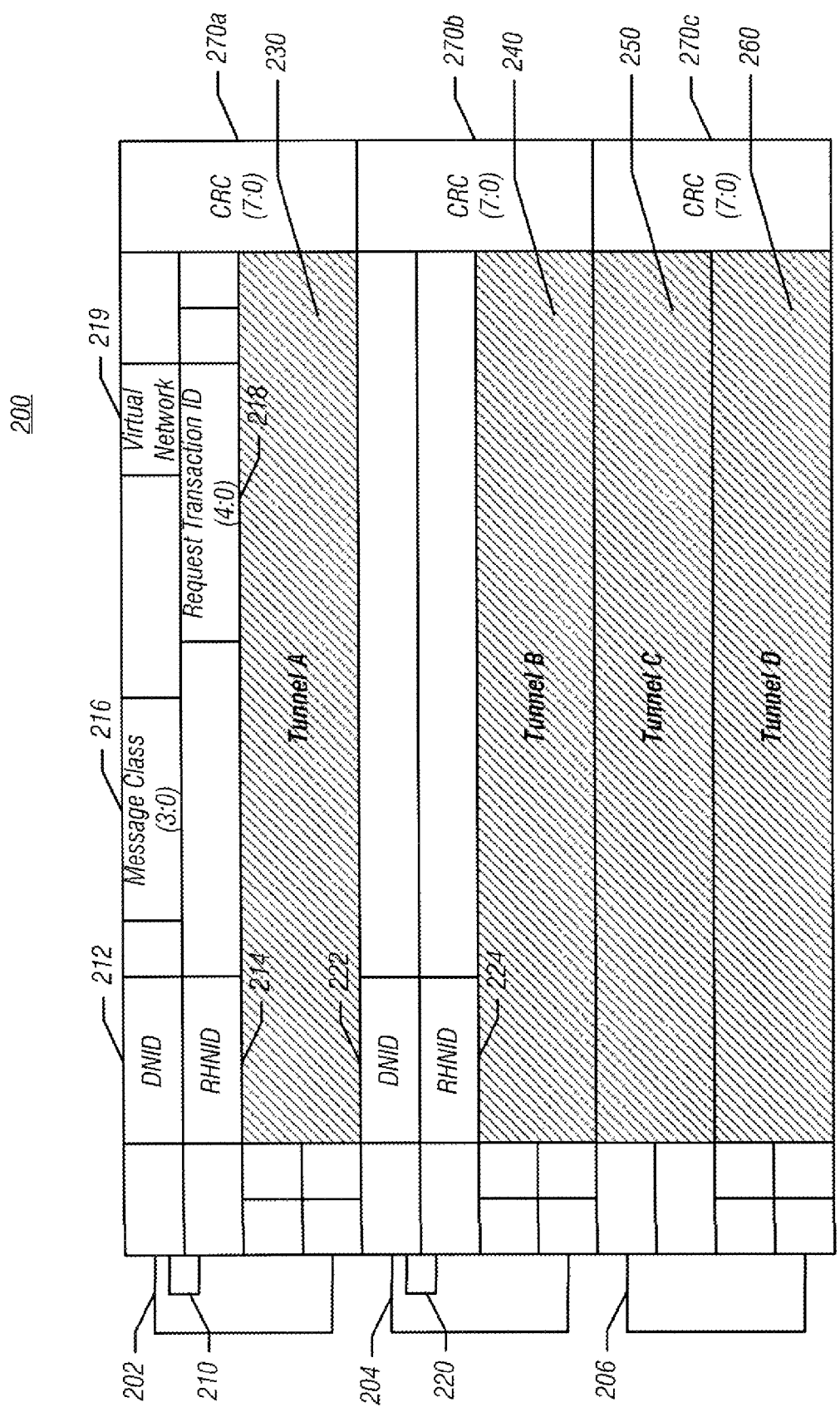
FIG. 4 is a diagram showing a data packet in accordance with one embodiment of the present invention.

Referring now to FIG. 4, shown is a diagram of a data packet in accordance with one embodiment of the present invention. As shown in FIG. 4, a packet 200 includes a system interconnect header formed from a first header portion 210 and second header portion 220, and tunneled information that is divided into four separate segments in the embodiment of FIG. 4 (shown in shaded view), namely tunneled portion A 230, tunneled portion B 240, tunneled portion C 250 and tunneled portion D 260. In one embodiment, the tunneled portions may include a PCI-E header and data from a PCI-E device.

In the embodiment shown in FIG. 4, each line of packet 200 may be twenty bits wide. As shown in FIG. 4, packet 200 may be formed of three flits, namely first flit 202, second flit 204 and third flit 206. While shown in the embodiment of FIG. 4 as including three such flits, it is to be understood that in other embodiments more or different flits or other sized groups of information may be present.

While various header information may be included in a coherent system header in accordance with an embodiment of the present invention, certain specific types of information are shown in FIG. 4 and are discussed herein. For example, first header portion 210 may include at least certain bits of a destination node ID (DNID) 212 that may be used to identify a destination node for the packet. Similarly, a requestor home node ID (RHNID) 214 may be used to identify the home node or coherent agent. Request transaction ID field 218 may be used to provide a unique identifier that uniquely identifies the transaction between the requesting coherent agent and a receiving coherent agent.

The destination node ID 212 may correspond to a destination ID of a receiving agent and typically corresponds to a home node ID, except in the case of a snoop request transaction, in which the destination ID corresponds to a destination of the request; the requester home node ID 214 typically corresponds to a requesting agent, except in the case of a snoop response, in which it corresponds to the home node ID. Thus, requestor home node ID 214 may correspond to home node ID 120 of FIG. 2; and the request transaction ID field 218 may correspond to the transaction ID 110 of FIG. 2. Thus in the embodiment of FIG. 4, the GUTI is formed of these three fields, although they are at non-contiguous locations within the header.

Also, a message class field 216 may identify a type of message being sent. A virtual network identifier 219 may be used to identify which of a plurality of virtual networks of a coherent system may be used to transmit packet 200.

Similarly, second header portion 220 may include further bits of a DNID 222 and a RHNID 224. In addition to header portions 210 and 220, additional system interconnect header information may be present, as shown in the various shaded portions of packet 200. Different information that may be used in a coherent system may be present in such shaded locations.

Also, cyclic redundancy check (CRC) bits 270a, 270b, and 270c may be provided with each flit to verify proper transmission and receipt of the flits. For example, a link layer of a receiving coherent agent may analyze the CRC bits to determine that the data was properly received. While shown as set forth in FIG. 4, it is to be understood that packets in accordance with an embodiment of the present invention may vary and may be differently sized, and may include a different header, tunneled and other information.

Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMS), erasable programmable read-only memories (EPROMs), flash memories, electrically erasable programmable read-only memories (EEPROMs), magnetic or optical cards, or any type of media suitable for storing electronic instructions.

Example embodiments may be implemented in software for execution by a suitable computer system configured with a suitable combination of hardware devices. For example, in certain embodiments, various coherent agents of a coherent system, such as I/O hubs, may include code or logic to uniquely identify transactions as described above.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
identifying a transaction from a first processor to a second processor with an identifier having a first value, the first value less than or equal to a maximum number of outstanding transactions between the first processor and the second processor, and forwarding the transaction to the second processor with a header including the identifier; and
identifying a second transaction from the first processor to a third processor with an identifier having the same first value, and forwarding the second transaction to the third processor with a header including the identifier.

2. The method of claim 1, wherein the header of the transaction further includes a source identifier corresponding to the first processor and a home node identifier corresponding to the second processor.

3. The method of claim 2, wherein the header of the second transaction further includes the source identifier corresponding to the first processor and a home node identifier corresponding to the third processor.

4. The method of claim 2, wherein the identifier, the source identifier and the home node identifier of the header of the transaction comprise a global transaction identifier.

5. The method of claim 1, wherein a transaction field for the identifier includes n bits, where the maximum number of outstanding transactions between the first processor and the second processor is less than or equal to $2^n$.

6. The method of claim 1, further comprising further identifying the second transaction with a second destination identifier different than a destination identifier of the first transaction.

7. The method of claim 1, further comprising forwarding the transaction to a bridge which broadcasts the transaction to a plurality of agents coupled thereto using the identifier.

8. The method of claim 7, further comprising broadcasting the transaction to each of the plurality of agents with a destination node identifier corresponding to each of the plurality of agents.

9. An article comprising a machine-accessible storage medium including instructions that when executed cause a system to:
form a first global identifier in a source component for a first transaction between the source component and a first destination component, the first global identifier including a source field to identify the source component, a first home node field to identify an owner of an address space corresponding to the first transaction, and a transaction field to identify the first transaction with respect to the source component and the first destination component; and
form a second global identifier in the source component for a second transaction between the source component and a second destination component that is outstanding with the first transaction, the second global identifier including the same source field, a second home node field to identify an owner of an address space corresponding to the second transaction, and the same transaction field to identify the second transaction with respect to the source component and the second destination component.

10. The article of claim 9, wherein the transaction field includes n bits, where a maximum number of outstanding transactions between the source component and the first destination component is less than or equal to $2^n$.

11. The article of claim 9, further comprising instructions that when executed cause the system to insert the first global identifier into a header and route the header from the source component to the first destination component, wherein a value of the transaction field is reusable for at least another outstanding transaction between the source component and another destination component.

12. The article of claim 11, further comprising instructions that when executed cause the system to determine whether the value of the transaction field is less than or equal to a maximum number of outstanding transactions between the source component and the first destination component.

13. The article of claim 9, further comprising instructions that when executed cause the system to snoop the first transaction in a third component of the system.

14. The article of claim 13, further comprising instructions that when executed cause the system to respond to the snooped transaction with a response header, the response header including the first global identifier.

15. An apparatus comprising:
a first bus agent to identify a transaction from the first bus agent to a second processor with an identifier having a first value, the first value less than or equal to a maximum number of outstanding transactions between the first bus agent and the second processor, transmit a header for the transaction including the identifier, identify a second transaction between the first bus agent and a third processor with the identifier having the first value, and transmit a header for the second transaction including the identifier.

16. The apparatus of claim 15, wherein the first bus agent is to further transmit the header for the first transaction including a source identifier corresponding to the first bus agent and a destination identifier corresponding to the second processor.

17. The apparatus of claim 16, wherein the first bus agent is to further transmit the header for the second transaction including the source identifier corresponding to the first processor and a home node identifier corresponding to the third processor.

18. The apparatus of claim 15, wherein the first bus agent comprises an input/output hub and the second processor comprises a bridging agent.

19. The apparatus of claim 15, wherein the first bus agent is to modify a size of the transaction field for the identifier during operation when at least one additional processing resource is added to a system.

* * * * *